US010466575B1

(12) United States Patent
Chen et al.

(10) Patent No.: US 10,466,575 B1
(45) Date of Patent: Nov. 5, 2019

(54) PROJECTOR AND PROJECTION LENS ADJUSTING MODULE

(71) Applicant: Coretronic Corporation, Hsin-Chu (TW)

(72) Inventors: Yi-Chang Chen, Hsin-Chu (TW); Chien-Chung Liao, Hsin-Chu (TW); Mao-Jen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/131,042

(22) Filed: Sep. 14, 2018

(30) Foreign Application Priority Data

Aug. 31, 2018 (CN) ...................... 2018 2 1421572 U

(51) Int. Cl.
  *G03B 21/14* (2006.01)
  *G02B 7/02* (2006.01)
  *G02B 27/09* (2006.01)

(52) U.S. Cl.
  CPC .......... *G03B 21/142* (2013.01); *G02B 7/022* (2013.01); *G02B 27/0955* (2013.01)

(58) Field of Classification Search
  CPC ... G03B 21/142; G02B 7/022; G02B 27/0955
  USPC ................................................ 353/100, 101
  See application file for complete search history.

(56) References Cited

U.S. PATENT DOCUMENTS

| 6,966,657 | B2 | 11/2005 | Van De Velde et al. | |
| 2008/0198340 | A1* | 8/2008 | Tsai | G02B 7/04 |
| | | | | 353/100 |
| 2012/0293778 | A1* | 11/2012 | Furuichi | G03B 5/04 |
| | | | | 353/101 |
| 2013/0120720 | A1* | 5/2013 | Hellin | G02B 7/021 |
| | | | | 353/101 |

FOREIGN PATENT DOCUMENTS

| CN | 102540654 | 8/2014 |
| TW | I325090 | 5/2010 |
| TW | I528099 | 4/2016 |

* cited by examiner

*Primary Examiner* — William C. Dowling
(74) *Attorney, Agent, or Firm* — JCIPRNET

(57) ABSTRACT

A projection lens adjusting module including at least one adjusting assembly and a base is provided. The at least one adjusting assembly includes a first screw fitting member and a stop structure. The stop structure has a first stop portion and a second stop portion opposite to each other, the first screw fitting member leans against the first stop portion, and a part of a projection lens is clamped between the first screw fitting member and the second stop portion. The first screw fitting member is screwed to the base and is configured to rotate relative to the base, so as to drive the adjusting assembly and the projection lens to move relative to the base. A projector using the aforementioned projection lens adjusting module is also provided. The projection lens adjusting module and the projector of the disclosure are capable of stably fixing the projection lens.

36 Claims, 6 Drawing Sheets

PROJECTOR AND PROJECTION LENS ADJUSTING MODULE

CROSS-REFERENCE TO RELATED APPLICATION

This application claims the priority benefit of China application serial no. 201821421572.7, filed on Aug. 31, 2018. The entirety of the above-mentioned patent application is hereby incorporated by reference herein and made a part of this specification.

BACKGROUND

Technical Field

The disclosure relates to a display device and an adjusting module thereof, and particularly relates to a projector and a projection lens adjusting module thereof.

Description of Related Art

Projector is a display device capable of generating images at anytime anywhere. An imaging principle of the projector is to convert an illumination beam produced by a light source into an image beam through a light valve, and then project the image beam to a screen or a wall through a projection lens to form an image. Along with progress of projection technology and reduction of manufacturing cost, the use of projectors has been gradually extended from commercial purposes to family uses.

In order to make an angle of the projection lens conform to an imaging angle of the light valve, in some projectors, the angle of the projection lens is adjusted by using a gasket. Such adjusting method requires to first measure an angle error of the projection lens, and then arrange the gasket used for compensation according to the angle error. However, if measurement of the angle error of the projection lens is not accurate, the arranged gasket cannot correctly compensate the angle error, and repeated error measurement and gasket arrangement is very laborious and time consuming. Another adjusting method is to adjust the angle of the projection lens through displacement caused by rotation of a bolt. Such adjusting method generally fixes the bolt and the projection lens by using an elastic force of a spring, though the characteristic of elastic deformation of the spring makes the projection lens easy to shake.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a projector and a projection lens adjusting module, which are capable of stably fixing a projection lens.

Other objects and advantages of the disclosure may be further illustrated by the technical features broadly embodied and described as follows.

In order to achieve one or a portion of or all of the objects or other objects, the disclosure provides a projector including a light source, a light valve, a projection lens and a projection lens adjusting module. The light source is configured to provide an illumination beam. The light valve is located on a transmission path of the illumination beam and is configured to convert the illumination beam into an image beam. The projection lens is located on a transmission path of the image beam and is configured to project the image beam out of the projector. The projection lens adjusting module includes at least one adjusting assembly and a base. The at least one adjusting assembly includes a first screw fitting member and a stop structure. The stop structure has a first stop portion and a second stop portion opposite to each other, the first screw fitting member leans against the first stop portion, and a part of the projection lens is clamped between the first screw fitting member and the second stop portion. The first screw fitting member is screwed to the base and is configured to rotate relative to the base, so as to drive the adjusting assembly and the projection lens to move relative to the base.

In order to achieve one or a portion of or all of the objects or other objects, the disclosure provides a projection lens adjusting module including at least one adjusting assembly and a base. The at least one adjusting assembly includes a first screw fitting member and a stop structure. The stop structure has a first stop portion and a second stop portion opposite to each other, the first screw fitting member leans against the first stop portion, and a part of a projection lens is clamped between the first screw fitting member and the second stop portion. The first screw fitting member is screwed to the base and is configured to rotate relative to the base, so as to drive the adjusting assembly and the projection lens to move relative to the base.

In order to achieve one or a portion of or all of the objects or other objects, the disclosure provides a projector including a light source, a light valve, a projection lens and a projection lens adjusting module. The light source is configured to provide an illumination beam. The light valve is located on a transmission path of the illumination beam and is configured to convert the illumination beam into an image beam. The projection lens is located on a transmission path of the image beam and is configured to project the image beam out of the projector. The projection lens adjusting module includes at least one adjusting assembly and a base. The at least one adjusting assembly includes a first screw fitting member, a stop structure and an elastic member. The stop structure has a first stop portion and a second stop portion opposite to each other, the first screw fitting member leans against the first stop portion, a part of the projection lens is clamped between the first screw fitting member and the second stop portion, and the elastic member is compressed between the base and the first screw fitting member. The first screw fitting member is screwed to the base and is configured to rotate relative to the base, so as to drive the adjusting assembly and the projection lens to move relative to the base.

In order to achieve one or a portion of or all of the objects or other objects, the disclosure provides a projection lens adjusting module including at least one adjusting assembly and a base. The at least one adjusting assembly includes a first screw fitting member, a stop structure and an elastic member. The stop structure has a first stop portion and a second stop portion opposite to each other, the first screw fitting member leans against the first stop portion, a part of a projection lens is clamped between the first screw fitting member and the second stop portion, and the elastic member is compressed between the base and the first screw fitting member. The first screw fitting member is screwed to the base and is configured to rotate relative to the base, so as to drive the adjusting assembly and the projection lens to move relative to the base.

According to the above description, the projection lens adjusting module of the disclosure drives the projection lens to move via displacement caused by rotation of the first screw fitting member screwed to the base, so as to adjust the angle of the projection lens. The second stop portion of the stop structure is used for commonly clamping the projection lens together with the first screw fitting member, and the first screw fitting member leans against the first stop portion of the stop structure, such that the first screw fitting member and the first stop portion of the stop structure stay closely alongside to each other and commonly move along a direction parallel with a rotation axis A. In this way, after adjustment of the angle of the projection lens is completed, the projection lens is fixed through mutual leaning of the first screw fitting member and the first stop portion, so as to avoid unexpected shake of the projection lens.

In order to make the aforementioned and other features and advantages of the disclosure comprehensible, several exemplary embodiments accompanied with figures are described in detail below.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
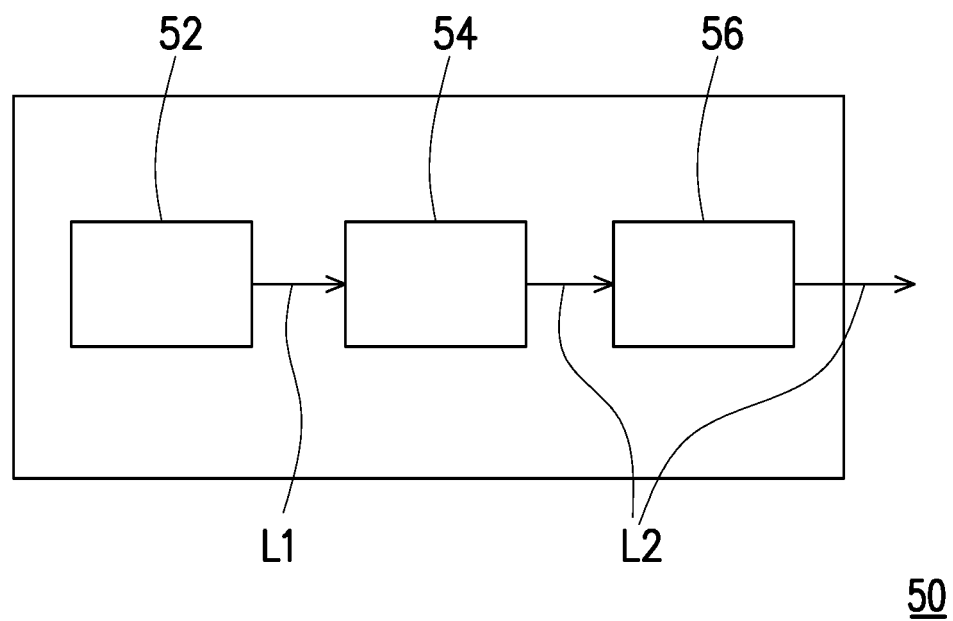
FIG. 1 is a schematic diagram of a projector according to an embodiment of the disclosure.

FIG. 1 is a schematic diagram of a projector according to an embodiment of the disclosure. Referring to FIG. 1, the projector 50 of the embodiment includes a light source 52, a light valve 54 and a projection lens 56. The light source 52 is used for providing an illumination beam L1. The light valve 54 is, for example, a Digital Micro-Mirror Device (DMD) and located on a transmission path of the illumination beam L1, and is configured to convert the illumination beam L1 into an image beam L2. The projection lens 56 is located on a transmission path of the image beam L2 and is configured to project the image beam L2 out of the projector 50.

Figure 2:
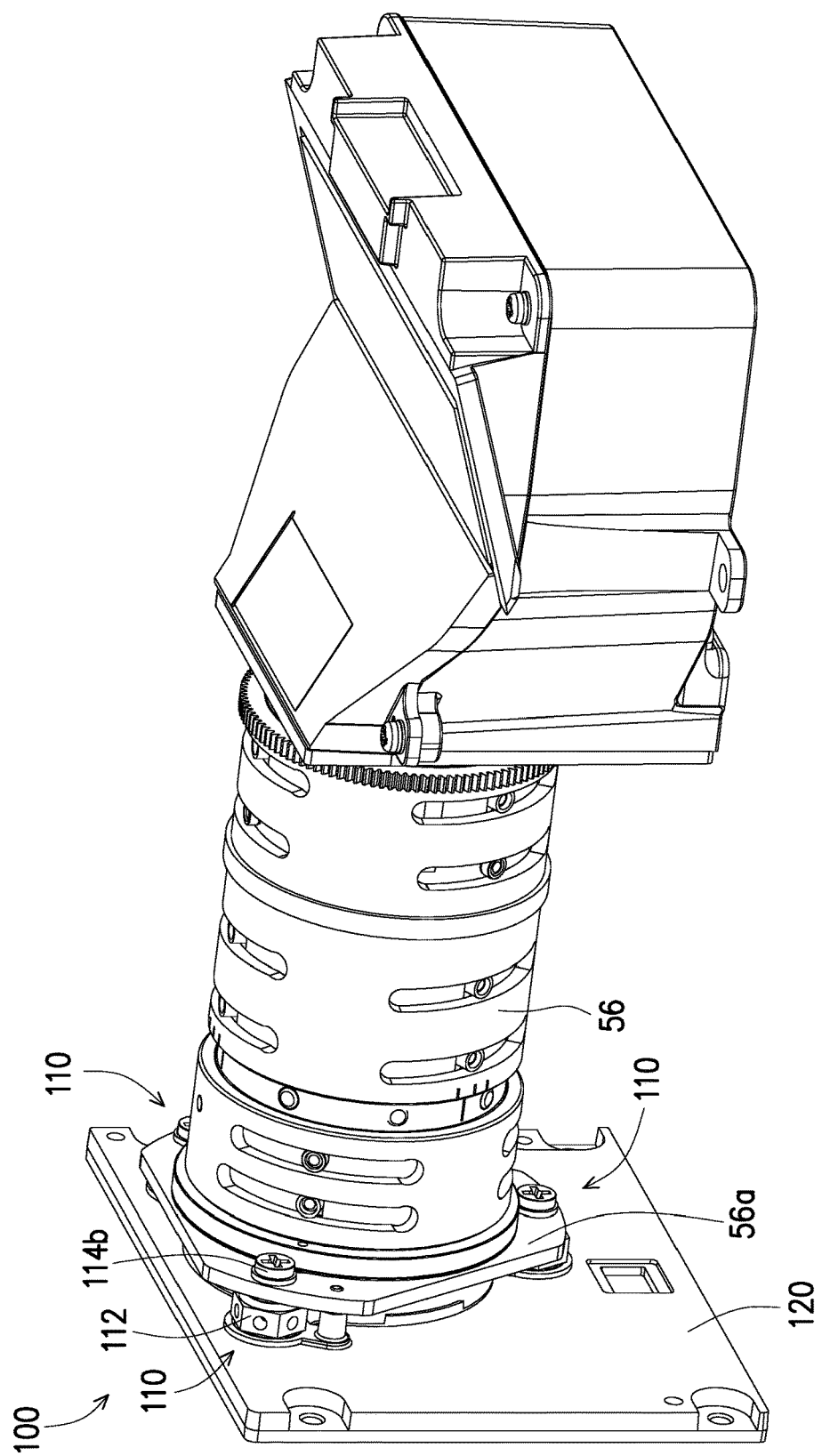
FIG. 2 is a three-dimensional view of a part of components of the projector of FIG. 1.
Figure 3:
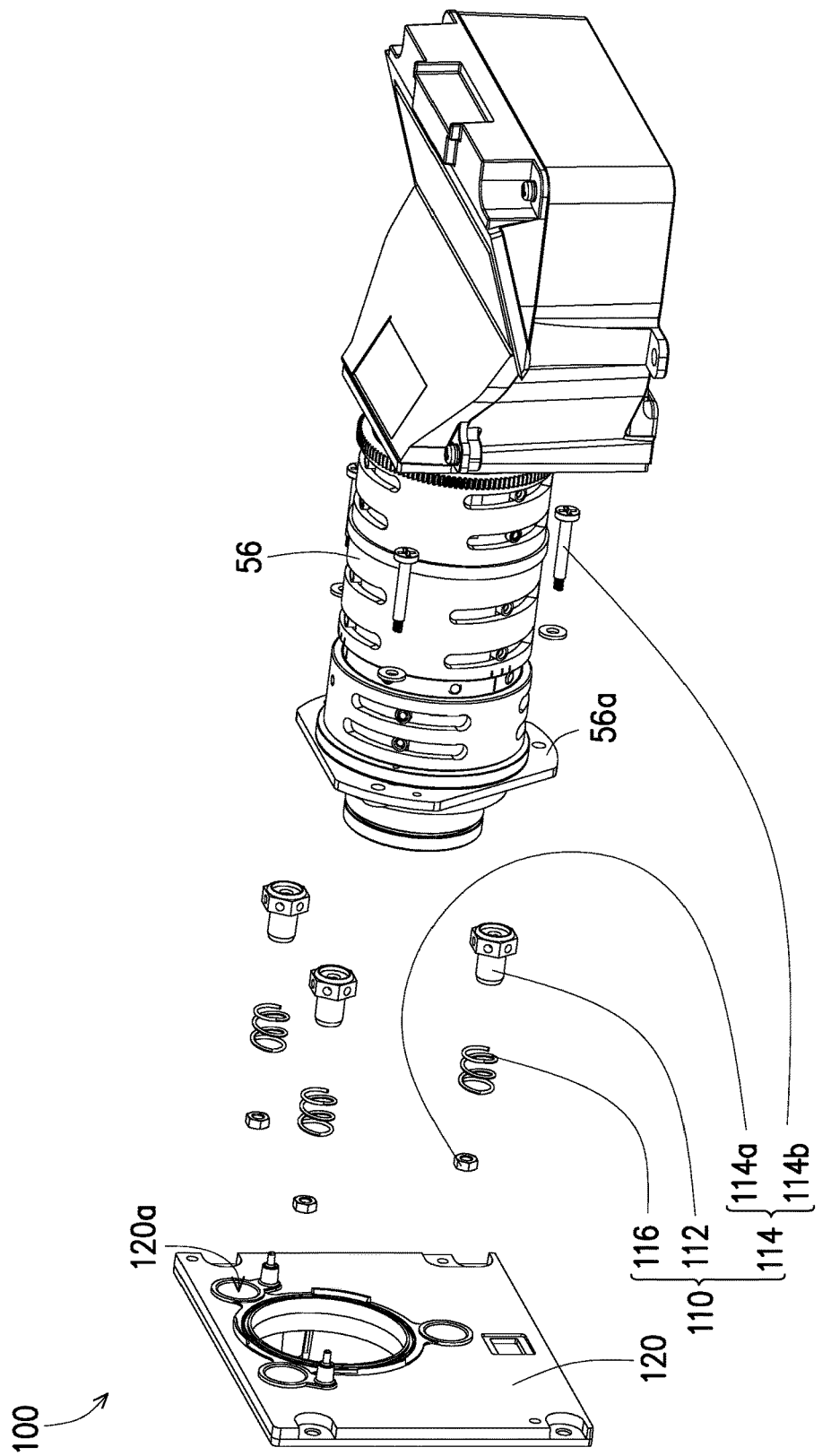
FIG. 3 is an exploded view of the projection lens and the projection lens adjusting module of FIG. 2.
Figure 4:
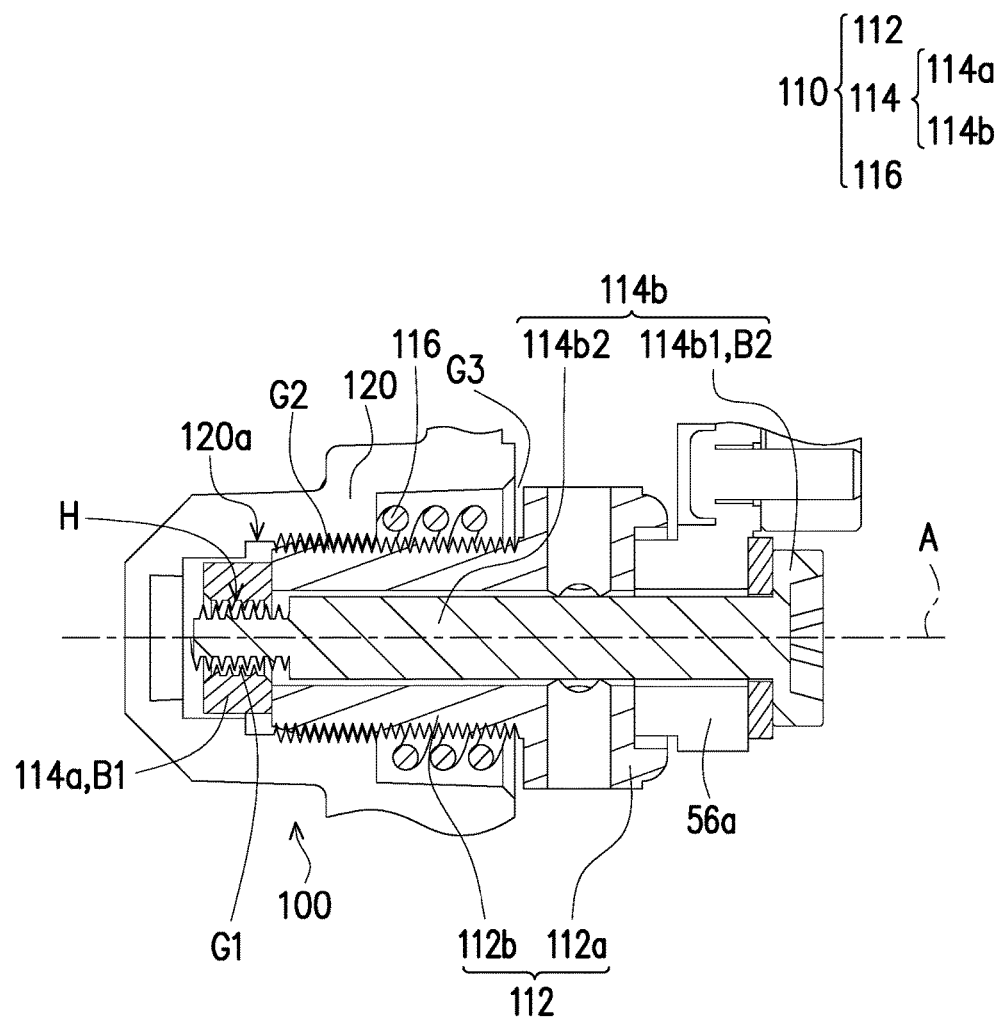
FIG. 4 is a partial cross-sectional view of the projection lens and the projection lens adjusting module of FIG. 2.

FIG. 2 is a three-dimensional view of a part of components of the projector of FIG. 1. FIG. 3 is an exploded view of the projection lens and the projection lens adjusting module of FIG. 2. FIG. 4 is a partial cross-sectional view of the projection lens and the projection lens adjusting module of FIG. 2. Referring to FIG. 2 to FIG. 4, the projector 50 of the embodiment (indicated in FIG. 1) further includes a projection lens adjusting module 100. The projection lens adjusting module 100 includes at least one adjusting assembly 110 (three adjusting assemblies 110 are illustrated in FIG. 2 and FIG. 3) and a base 120. Each of the adjusting assemblies 110 includes a first screw fitting member 112 and a stop structure 114. The stop structure 114 has a first stop portion B1 and a second stop portion B2 opposite to each other as shown in FIG. 4, the first screw fitting member 112 leans against the first stop portion B1, and a part of the projection lens 56 (illustrated as a flange 56a of the projection lens 56) is clamped between the first screw fitting member 112 and the second stop portion B2.

The first screw fitting member 112 is screwed to the base 120 and is rotated relative to the base 120 along a rotation axis A, so as to drive the adjusting assembly 110 and the projection lens 56 to move relative to the base 120 along a direction parallel with the rotation axis A. By adjusting the adjusting assemblies 110 at three different positions in the aforementioned way, an effect of adjusting an angle of the projection lens 56 is achieved.

Under such configuration, since the first screw fitting member 112 leans against the first stop portion B1 of the stop structure 114, the first screw fitting member 112 and the first stop portion B1 of the stop structure 114 stay closely alongside to each other and commonly move along the direction parallel with the rotation axis A. To be specific, when the first screw fitting member 112 moves along the direction parallel with the rotation axis A, the first stop portion B1 also moves along the direction parallel with the rotation axis A, and during the above moving process, the first screw fitting member 112 and the first stop portion B1 stay closely alongside to each other, though when the first screw fitting member 112 is rotated relative to the base 120 along the rotation axis A, the first stop portion B1 is not rotated relative to the base 120 along the rotation axis A. In this way, after the adjustment of the angle of the projection lens 56 is completed, the projection lens 56 is fixed through mutual leaning of the first screw fitting member 112 and the first stop portion B1, so as to avoid unexpected shake of the projection lens 56.

Referring to FIG. 4, the base 120 of the embodiment has at least one recess portion 120a (three recess portions 120a are illustrated in FIG. 3), and the first stop portion B1 of each of the stop structures 114 is located in the corresponding recess portion 120a. Each of the first screw fitting members 112 is, for example, a screw and includes a head portion 112a and a screw fitting portion 112b connected to each other, where the screw fitting portion 112b partially stretches into the corresponding recess portion 120a to lean against the first stop portion B1, and is screwed to an internal thread of an inner wall of the recess portion 120a through an external thread thereof. To be specific, the stop structure 114 includes a second screw fitting member 114a and a third screw fitting member 114b. The second screw fitting member 114a is, for example, a nut and has a screw fitting hole H, and the second screw fitting member 114a constitutes the aforementioned first stop portion B1. The third screw fitting member 114b is, for example, a screw bolt and includes a top portion 114b1 and a stem portion 114b2 connected to each other, where the top portion 114b1 constitutes the aforementioned second stop portion B2, and the stem portion 114b2 penetrates through the flange 56a of the projection lens 56 and the first screw fitting member 112 and is screwed to an internal thread of the screw fitting hole H through an external thread at an end thereof.

In the embodiment, the projection lens adjusting module 100 further includes adhesives G1, G2, G3. After the adjustment of the angle of the projection lens 56 is completed, the adhesive G3 may be filled between the base 120 and the first screw fitting member 112, so as to stably fix a relative position of the base 120 and the first screw fitting member 112, where the adhesive G3 may be distributed in a dispensing manner, or distributed in a manner of surrounding the first screw fitting member 112, and if the adhesive G3 is distributed in the manner of surrounding the first screw fitting member 112, a more stable fixing effect is achieved. Moreover, the adhesive G1 may be filled between the stem portion 114b2 of the third screw fitting member 114b and the second screw fitting member 114a, so as to avoid looseness between the external thread of the stem portion 114b2 of the third screw fitting member 114b and the internal thread of the screw fitting hole H of the second screw fitting member 114a caused by a gap there between. Similarly, the adhesive G2 may be filled between the screw fitting portion 112b of the first screw fitting member 112 and the inner wall of the recess portion 120a, so as to avoid looseness between the external thread of the screw fitting portion 112b of the first screw fitting member 112 and the internal thread of the inner wall of the recess portion 120a caused by a gap there between. The adhesive G3 is, for example, an UV adhesive or other proper adhesives, and the adhesives G1, G2, for example, include resin, which is not limited by the disclosure.

Each of the adjusting assemblies 110 of the embodiment may further include an elastic member 116. The elastic member 116 is, for example, a compression spring and is compressed between the base 120 and the head portion 112a of the first screw fitting member 112, so as to further avoid looseness between the external thread of the screw fitting portion 112b of the first screw fitting member 112 and the internal thread of the inner wall of the recess portion 120a caused by a gap there between. In other embodiments, configuration of the elastic member between the base and the first screw fitting member may also be omitted, which is described below with reference of figures.

Figure 5:
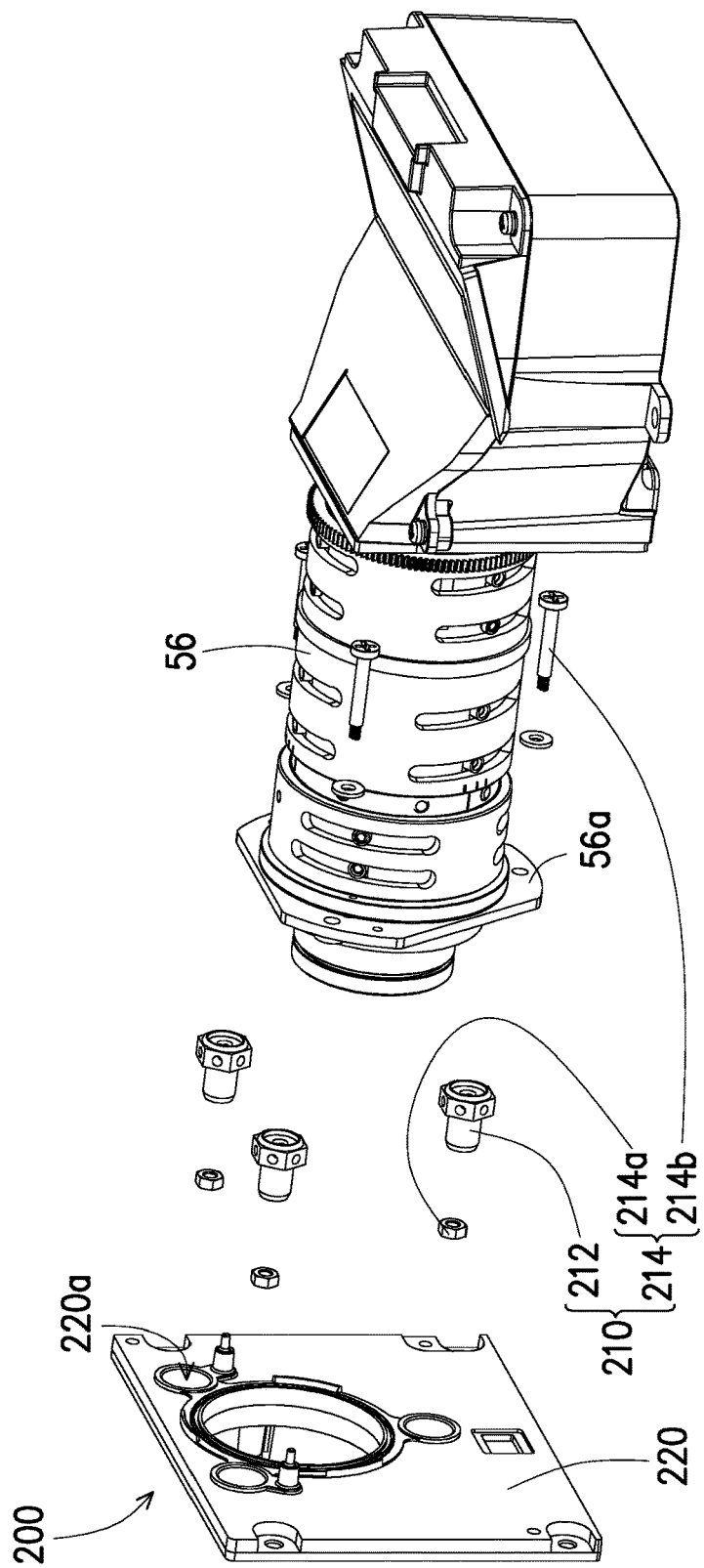
FIG. 5 is an exploded view of a projection lens and a projection lens adjusting module according to another embodiment of the disclosure.
Figure 6:
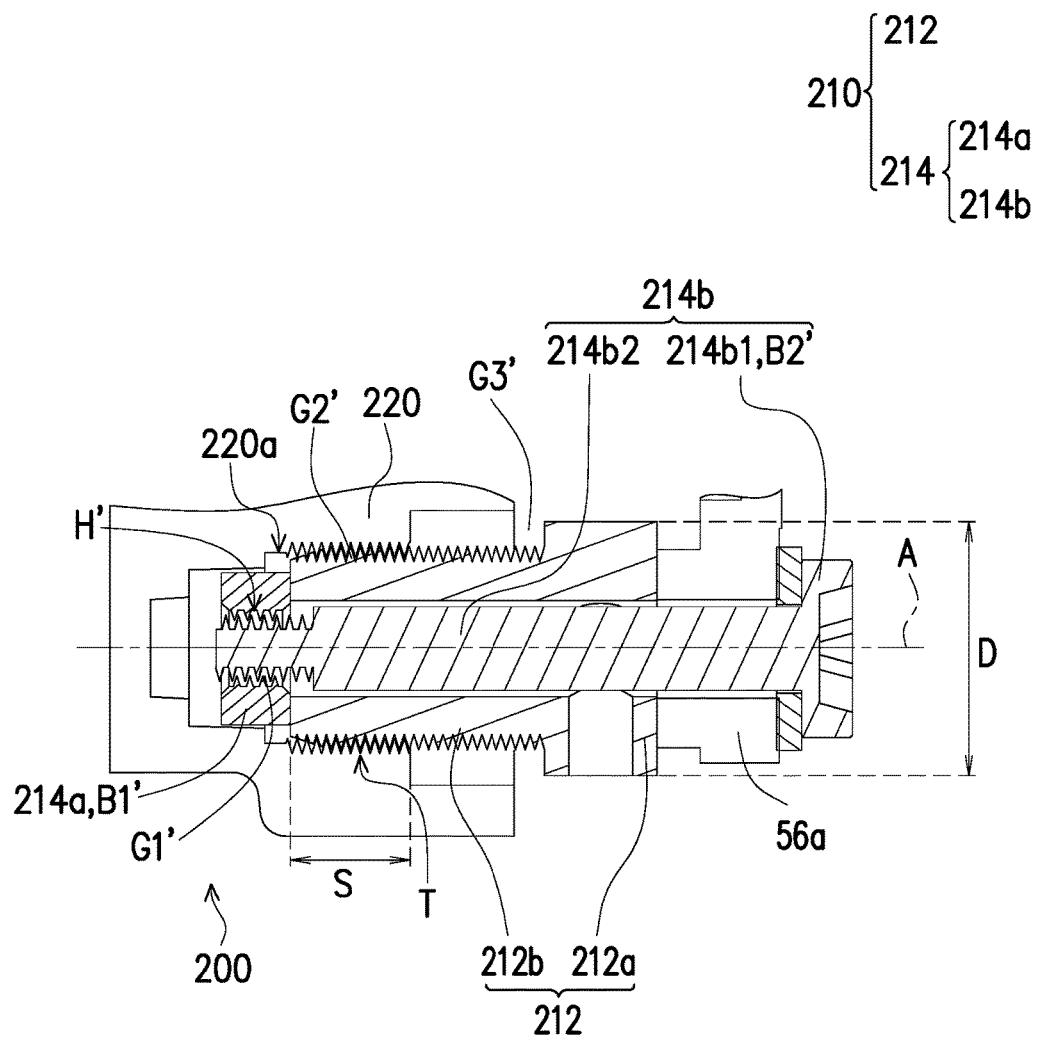
FIG. 6 is a partial cross-sectional view of the projection lens and the projection lens adjusting module of FIG. 5.

FIG. 5 is an exploded view of a projection lens and a projection lens adjusting module according to another embodiment of the disclosure. FIG. 6 is a partial cross-sectional view of the projection lens and the projection lens adjusting module of FIG. 5. In the projection lens adjusting module 200 shown in FIG. 5 and FIG. 6, configurations and functions of an adjusting assembly 210, a first screw fitting member 212, a head portion 212a, a screw fitting portion 212b, a stop structure 214, a second screw fitting member 214a, a third screw fitting member 214b, a top portion 214b1, a stem portion 214b2, a base 220, a recess portion 220a, a first stop portion B1', a second stop portion B2', a screw fitting hole H', an adhesive G1', an adhesive G2' and an adhesive G3' are similar to that of the adjusting assembly 110, the first screw fitting member 112, the head portion 112a, the screw fitting portion 112b, the stop structure 114, the second screw fitting member 114a, the third screw fitting member 114b, the top portion 114b1, the stem portion 114b2, the base 120, the recess portion 120a, the first stop portion B1, the second stop portion B2, the screw fitting hole H, the adhesive G1, the adhesive G2 and the adhesive G3 of FIG. 3 and FIG. 4, and details thereof are not repeated.

A difference between the projection lens adjusting module 200 and the projection lens adjusting module 100 is that elastic member is not configured between the base 220 and the first screw fitting member 212. Since configuration of the elastic member is omitted, the head portion 212a of the first screw fitting member 212 is unnecessary to stop the elastic member, so that the head portion 212a may have a smaller outer diameter to save a configuration space and avoid interfering with the projection lens 56. To be specific, the outer diameter D of the head portion 212a of the embodiment is, for example, not greater than 10 mm. Moreover, since the base 220 and the first screw fitting member 212 are unnecessary to provide a space for configuring the elastic member there between, the base 220 may have a larger extending range to screw to the first screw fitting member 212. To be specific, the screw fitting portion 212b of the first screw fitting member 212 is screwed to the base 220 through a thread thereon, where a part of the screw fitting portion 212b screwed to the base 220 constitutes a screw fitting section T, and a length S of the screw fitting section T is, for example, not less than 45% of a length of the screw fitting portion 212b. For example, the length of the screw fitting portion 212b of the first screw fitting member 212 is, for example, 10 mm, and the length S of the screw fitting section T is, for example, not less than 4.5 mm.

In summary, the projection lens adjusting module of the disclosure drives the projection lens to move via displacement caused by rotation of the first screw fitting member screwed to the base, so as to adjust the angle of the projection lens. The second stop portion of the stop structure is used for commonly clamping the projection lens together with the first screw fitting member, and the first screw fitting member leans against the first stop portion of the stop structure, such that the first screw fitting member and the first stop portion of the stop structure stay closely alongside to each other and commonly move along a direction parallel with a rotation axis A. In this way, after adjustment of the angle of the projection lens is completed, the projection lens is fixed through mutual leaning of the first screw fitting member and the first stop portion, so as to avoid unexpected shake of the projection lens.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, comprising:
    a light source, configured to provide an illumination beam;
    a light valve, located on a transmission path of the illumination beam and configured to convert the illumination beam into an image beam;
    a projection lens, located on a transmission path of the image beam and configured to project the image beam out of the projector; and
    a projection lens adjusting module, comprising:
        at least one adjusting assembly, comprising a first screw fitting member and a stop structure, wherein the stop structure has a first stop portion and a second stop portion opposite to each other, the first screw fitting member leans against the first stop portion, and a part of the projection lens is clamped between the first screw fitting member and the second stop portion; and
        a base, wherein the first screw fitting member is screwed to the base and is configured to rotate relative to the base, so as to drive the at least one adjusting assembly and the projection lens to move relative to the base.

2. The projector as claimed in claim 1, wherein the stop structure comprises a second screw fitting member and a third screw fitting member, the second screw fitting member constitutes the first stop portion and has a screw fitting hole, and the third screw fitting member comprises a top portion and a stem portion connected to each other, the top portion constitutes the second stop portion, and the stem portion is screwed to the screw fitting hole.

3. The projector as claimed in claim 2, wherein the projection lens adjusting module comprises an adhesive, and the adhesive is filled between the stem portion and the second screw fitting member.

4. The projector as claimed in claim 1, wherein the base has at least one recess portion, the first stop portion is located in the at least one recess portion, the first screw fitting member is partially stretched into the at least one recess portion to lean against the first stop portion and is screwed to an inner wall of the at least one recess portion.

5. The projector as claimed in claim 4, wherein the projection lens adjusting module comprises an adhesive, and the adhesive is filled between the first screw fitting member and the inner wall of the at least one recess portion.

6. The projector as claimed in claim 1, wherein the projection lens adjusting module comprises an adhesive, a gap exists between the base and the first screw fitting member, and the adhesive is filled in the gap.

7. The projector as claimed in claim 6, wherein the adhesive surrounds the first screw fitting member.

8. The projector as claimed in claim 1, wherein the base and the first screw fitting member do not have an elastic member there between.

9. The projector as claimed in claim 1, wherein the first screw fitting member comprises a head portion and a screw fitting portion connected to each other, the screw fitting portion is screwed to the base, and an outer diameter of the head portion is not greater than 10 mm.

10. The projector as claimed in claim 1, wherein the first screw fitting member comprises a head portion and a screw fitting portion connected to each other, the screw fitting portion is screwed to the base, a part of the screw fitting portion screwed to the base constitutes a screw fitting section, and a length of the screw fitting section is not less than 4.5 mm.

11. The projector as claimed in claim 1, wherein the first screw fitting member comprises a head portion and a screw fitting portion connected to each other, the screw fitting portion is screwed to the base, a part of the screw fitting portion screwed to the base constitutes a screw fitting section, and a length of the screw fitting section is not less than 45% of a length of the screw fitting portion.

12. A projection lens adjusting module, comprising:
at least one adjusting assembly, comprising a first screw fitting member and a stop structure, wherein the stop structure has a first stop portion and a second stop portion opposite to each other, the first screw fitting member leans against the first stop portion, and a part of a projection lens is clamped between the first screw fitting member and the second stop portion; and
a base, wherein the first screw fitting member is screwed to the base and is configured to rotate relative to the base, so as to drive the at least one adjusting assembly and the projection lens to move relative to the base.

13. The projection lens adjusting module as claimed in claim 12, wherein the stop structure comprises a second screw fitting member and a third screw fitting member, the second screw fitting member constitutes the first stop portion and has a screw fitting hole, and the third screw fitting member comprises a top portion and a stem portion connected to each other, the top portion constitutes the second stop portion, and the stem portion is screwed to the screw fitting hole.

14. The projection lens adjusting module as claimed in claim 13, wherein the projection lens adjusting module comprises an adhesive, and the adhesive is filled between the stem portion and the second screw fitting member.

15. The projection lens adjusting module as claimed in claim 12, wherein the base has at least one recess portion, the first stop portion is located in the at least one recess portion, the first screw fitting member is partially stretched into the at least one recess portion to lean against the first stop portion and is screwed to an inner wall of the at least one recess portion.

16. The projection lens adjusting module as claimed in claim 15, further comprising an adhesive, wherein the adhesive is filled between the first screw fitting member and the inner wall of the at least one recess portion.

17. The projection lens adjusting module as claimed in claim 12, further comprising an adhesive, wherein a gap exists between the base and the first screw fitting member, and the adhesive is filled in the gap.

18. The projection lens adjusting module as claimed in claim 17, wherein the adhesive surrounds the first screw fitting member.

19. The projection lens adjusting module as claimed in claim 12, wherein the base and the first screw fitting member do not have an elastic member there between.

20. The projection lens adjusting module as claimed in claim 12, wherein the first screw fitting member comprises a head portion and a screw fitting portion connected to each other, the screw fitting portion is screwed to the base, and an outer diameter of the head portion is not greater than 10 mm.

21. The projection lens adjusting module as claimed in claim 12, wherein the first screw fitting member comprises a head portion and a screw fitting portion connected to each other, the screw fitting portion is screwed to the base, a part of the screw fitting portion screwed to the base constitutes a screw fitting section, and a length of the screw fitting section is not less than 4.5 mm.

22. The projection lens adjusting module as claimed in claim 12, wherein the first screw fitting member comprises a head portion and a screw fitting portion connected to each other, the screw fitting portion is screwed to the base, a part of the screw fitting portion screwed to the base constitutes a screw fitting section, and a length of the screw fitting section is not less than 45% of a length of the screw fitting portion.

23. A projector, comprising:
a light source, configured to provide an illumination beam;
a light valve, located on a transmission path of the illumination beam and configured to convert the illumination beam into an image beam;
a projection lens, located on a transmission path of the image beam and configured to project the image beam out of the projector; and
a projection lens adjusting module, comprising:
at least one adjusting assembly, comprising a first screw fitting member, a stop structure and an elastic member, wherein the stop structure has a first stop portion and a second stop portion opposite to each other, the first screw fitting member leans against the first stop portion, a part of the projection lens is clamped between the first screw fitting member and the second stop portion, and the elastic member is compressed between the base and the first screw fitting member; and
a base, wherein the first screw fitting member is screwed to the base and is configured to rotate relative to the base, so as to drive the at least one adjusting assembly and the projection lens to move relative to the base.

24. The projector as claimed in claim 23, wherein the stop structure comprises a second screw fitting member and a third screw fitting member, the second screw fitting member constitutes the first stop portion and has a screw fitting hole, and the third screw fitting member comprises a top portion and a stem portion connected to each other, the top portion constitutes the second stop portion, and the stem portion is screwed to the screw fitting hole.

25. The projector as claimed in claim 24, wherein the projection lens adjusting module comprises an adhesive, and the adhesive is filled between the stem portion and the second screw fitting member.

26. The projector as claimed in claim 23, wherein the base has at least one recess portion, the first stop portion is located in the at least one recess portion, the first screw fitting member is partially stretched into the at least one recess portion to lean against the first stop portion and is screwed to an inner wall of the at least one recess portion.

27. The projector as claimed in claim 26, wherein the projection lens adjusting module comprises an adhesive, and the adhesive is filled between the first screw fitting member and the inner wall of the at least one recess portion.

28. The projector as claimed in claim 23, wherein the projection lens adjusting module comprises an adhesive, a gap exists between the base and the first screw fitting member, and the adhesive is filled in the gap.

29. The projector as claimed in claim 23, wherein the first screw fitting member comprises a head portion and a screw fitting portion connected to each other, the screw fitting portion is screwed to the base, and the elastic member is compressed between the head portion and the base.

30. A projection lens adjusting module, comprising:
at least one adjusting assembly, comprising a first screw fitting member, a stop structure and an elastic member, wherein the stop structure has a first stop portion and a second stop portion opposite to each other, the first screw fitting member leans against the first stop portion, a part of a projection lens is clamped between the first screw fitting member and the second stop portion, and the elastic member is compressed between the base and the first screw fitting member; and a base, wherein the first screw fitting member is screwed to the base and is configured to rotate relative to the base, so as to drive the at least one adjusting assembly and the projection lens to move relative to the base.

31. The projection lens adjusting module as claimed in claim 30, wherein the stop structure comprises a second screw fitting member and a third screw fitting member, the second screw fitting member constitutes the first stop portion and has a screw fitting hole, and the third screw fitting member comprises a top portion and a stein portion connected to each other, the top portion constitutes the second stop portion, and the stem portion is screwed to the screw fitting hole.

32. The projection lens adjusting module as claimed in claim 31, wherein the projection lens adjusting module comprises an adhesive, and the adhesive is filled between the stem portion and the second screw fitting member.

33. The projection lens adjusting module as claimed in claim 30, wherein the base has at least one recess portion, the first stop portion is located in the at least one recess portion, the first screw fitting member is partially stretched into the at least one recess portion to lean against the first stop portion and is screwed to an inner wall of the at least one recess portion.

34. The projection lens adjusting module as claimed in claim 33, further comprising an adhesive, wherein the adhesive is filled between the first screw fitting member and the inner wall of the at least one recess portion.

35. The projection lens adjusting module as claimed in claim 30, further comprising an adhesive, wherein a gap exists between the base and the first screw fitting member, and the adhesive is filled in the gap.

36. The projection lens adjusting module as claimed in claim 30, wherein the first screw fitting member comprises a head portion and a screw fitting portion connected to each other, the screw fitting portion is screwed to the base, and the elastic member is compressed between the head portion and the base.

* * * * *